Patented Aug. 31, 1943

2,328,481

UNITED STATES PATENT OFFICE 2,328,481

BITUMINOUS EMULSION AND METHOD OF PRODUCING

Evart E. Mayfield, Wilmington, Del., assignor to Hercules Powder Company, Wilmington, Del., a corporation of Delaware No Drawing. Application July 31, 1941,
Serial No. 404,846

4 Claims. (Cl. 252—311.5)

This invention relates to stable emulsions of bituminous substances and more particularly to the preparation of highly stable bitumen emulsions, e. g. asphalt emulsions.

Bitumen emulsions have been prepared in the art with various aqueous soap solutions including rosin soap solutions as emulsifying agents. An improved type of bituminous emulsion has also been produced with use of a soap of a petroleum hydrocarbon-insoluble pine wood resin as emulsifying and stabilizing agent, as described in U. S. Patent 2,199,206. In using such rosin or resin soaps in such emulsions, it has been necessary to include some free alkali to increase the emulsifying efficiency. However, the alkalinity so produced is objectionable because on application of the emulsion to aggregate the alkali serves to reduce the activity of the aggregate on the emulsion, thereby providing decreased adhesion of the bitumen to the aggregate. Also, the alkalinity has a tendency to retard the drying of the emulsion as evidenced by the low dehydration value. Buffering agents which are weak acids have been added to the emulsions, thereby reducing the alkalinity, but not eliminating it, since poor stability would develop.

It is an object of this invention to provide a method of producing improved stable bituminous emulsions.

A further object is to provide a method of producing stabilized bituminous emulsions characterized by high stability in neutral, alkaline or acid media and in the presence of electrolytes.

Another object is to provide a method of producing stabilized bituminous road emulsions characterized by a high affinity for road aggregate.

A still further object is to provide bituminous emulsions characterized by high stability in neutral, acid or alkaline media and having high affinity for road aggregate.

Other objects of the invention will appear hereinafter.

The above objects may be accomplished in accordance with this invention by emulsifying a bituminous substance in water with a sufonation product of a substantially petroleum hydrocarbon-insoluble resin as emulsifying and stabilizing agent. It has been found in accordance with this invention that such a sulfonation product either in its acidic or neutralized form provides superior emulsifying characteristics for bituminous emulsions in neutral and acid media and avoids the disadvantages associated with use of alkali.

The resin which is used to provide the sufonation product used as an emulsifying and stabilizing agent in accordance with this invention and which is characterized by the term "substantially petroleum hydrocarbon-insoluble pine wood resin" herein and in the appended claims is the resinous material which may be prepared from pine wood, preferably from stump pine wood in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum hydrocarbon-insoluble resin is found dissolved in the furfural from which it may be obtained by evaporation of the furfural. Other methods of isolating the petroleum hydrocarbon-insoluble pine wood resin may be employed, if desired. The resin may be defoamed by steaming or heat treated to remove volatile substances.

This resinous material which is subsequently sulfonated is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocarbons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C. and a non-carboxylic hydroxyl content of about 5 to about 9 percent.

By sulfonating the above-described resin by treatment of the latter with a sulfonating agent, as for example, concentrated or fuming sulfuric acid, sulfur trioxide, chloro-sulfonic acid, acetyl sulfuric acid, sulfur trioxide-dioxane complex, etc. at temperatures from about 10° C. to about 150° C., a sulfonation product is obtained which has high wetting-out and detergent characteristics in water solution. The sulfonation product is acidic in character and may be neutralized with suitable inorganic or organic bases to form water-soluble salts. Such salts also possess the high wetting-out and detergent characteristics and are considered as included within the term "sulfonation product" herein and in the appended claims.

Any bituminous substances may be employed in the emulsions according to this invention. Thus, bitumens such as asphalts and asphaltites, pyrobitumens such as olaterite, pyrogenous distillates such as coal and shale tars, pyrogenous residues such as blown petroleum asphalts, fatty acid pitch and rosin pitch, etc., may be employed.

The bituminous emulsions may be prepared by adding the sulfonation product of the pine wood resin to the bituminous substance and emulsifying the mixture in water, or by adding the bitument to water containing the sulfonation product of the pine wood resin and emulsifying the mixture. Other emulsifying and stabilizing agents may be included, if desired and other methods for carrying out the emulsification may be employed.

The amount of sulfonation product of the substantially petroleum hydrocarbon-insoluble pine wood resin used in the emulsions will vary to some extent with the ratio of bitumen to water in the emulsion, the impurities present, the exact composition of the sulfonated product employed, etc. It is therefore impossible to define the required amounts accurately. The examples which follow will serve to indicate the amount which may be required in a given case. With use of as little as 5 parts of the sulfonated product per thousand parts of emulsion, satisfactory emulsification is obtained in many cases, whereas amounts as high as 20 parts per 1,000 parts of emulsion are satisfactory under other conditions. An amount of sulfonation product above about 30 parts per 1,000 parts of emulsion is not contemplated.

The emulsions prepared according to this invention are very exceptional in their high stability over widely varying conditions. They have high stability in the presence of acids, being stable even in the presence of strong and concentrated acids such as concentrated hydrochloric acid and at the same time being quite stable in the presence of relatively strong alkalies, such as alkalies as strong as milk of lime. The stability may become somewhat diminished in the presence of free alkali metal hydroxides and inclusion of an auxiliary stabilization agent is desirable when stability to such alkalies for extended periods is desired. Therefore, in the emulsions prepared according to the invention, any appreciable quantity of alkali metal hydroxide will be excluded. Small amounts may be present without detrimenting the desirable characteristics of the emulsions.

This property of stability to various conditions contributed by the sulfonation product of the pine wood resin is extremely valuable in bituminous emulsions for a number of reasons. It allows greater flexibility in preparation of an emulsion to meet a wide variety of specifications. It allows the production in an economical manner of neutral or acid bituminous emulsions which have greater affinity on aggregates and which provide better adhesion of the bitumen to the aggregate. It allows regulation of the mobility of the emulsion by the use of acids as agents for increasing mobility. In addition to the property of high stability over a wide pH range, the emulsions prepared according to this invention have a very high dehydration value, a property not generally associated with high stability. The higher dehydration value represents a higher rate of evaporation of water from the emulsions, which is an extremely important and valuable property in bituminous emulsions employed in road surfacing. The emulsions prepared in accordance with the invention are also advantageous because of their stability in the presence of other electrolytes such as inorganic salts, acid salts, etc.

The examples which follow will serve to illustrate the various embodiments of the invention. As a means of measuring the stability and dehydration value of the emulsions described in the examples, the well-known standard cement mixing test, the demulsibility test with calcium chloride and the dehydration test are employed.

The cement mixing test is a widely recognized test for stability of the emulsion against the physical and chemical action occurring when mixing with materials such as aggregates containing finely-divided materials and is described in "Modern Road Emulsions," second edition, by F. H. Garner, T. G. Gabriel, and H. J. Prentice, printed by John Bellows, Ltd, Gloucester. The test was carried out in the examples as follows: To 50 grams of Portland high early strength cement (100% through 80 mesh) in a standard beaker were added 100 grams of a bituminous emulsion containing 55% solids (100% passing a 20 mesh sieve), and this mixture stirred slowly (60 times per minute) for one minute. To this was added 150 cc. of distilled water and the resulting mixture stirred slowly for three minutes. The contents of the beaker were poured over a 14 mesh iron screen, and the beaker and the residue on the screen washed with distilled water until the washings were appreciably clean. The screen, residue, stirring rod and container were dried, then weighed, and the weight of rod, beaker and screen subtracted. The residue in grams represents coagulated bitumen and occluded cement. Most specifications for road surfacing emulsions call for 5 grams or less residue by this test. In the examples the emulsions will be designated as having passed the cement mixing test when leaving a residue less than 5 grams and as having failed when leaving a residue greater than 5 grams.

The demulsibility test is a common one for testing bituminous emulsions against the action of electrolytes. It was carried out as follows: To 100 grams of a 60% solids asphalt emulsion was added 35 cc. of 0.01 normal calcium chloride solution, with stirring, during 2 minutes. The residue was washed through a 20 mesh sieve, then dried and weighed. The ratio of the residue remaining to the asphalt content of the emulsion is expressed as the percent demulsibility.

In measuring the dehydration value of the emulsions, the percent of water lost from the emulsion by evaporation at 100° F. for 96 hours under standard conditions is determined.

*Example 1*

An emulsion was prepared as follows: To 400 parts by weight of water 4 parts by weight of the acidic sulfonation product of a substantially petroleum hydrocarbon-insoluble pine wood resin were added and 600 parts by weight of Venezuelan asphalt were then emulsified in the aqueous phase. The emulsion obtained had a dehydration value of 90%, showed only a trace of residue in the demulsibility test, and passed the cement mixing test leaving only a trace of residue. The emulsion was stable when mixed in any proportion with concentrated hydrochloric acid, and was also stable when mixed in any proportion with milk of lime.

*Example 2*

By repeating the procedure of Example 1 but with use of 20 parts by weight of the sulfonation product, a similar emulsion was obtained. It had a dehydration value of 88% and also showed only a trace of residue in the demulsibility test and passed the cement mixing test leaving only a trace of residue.

*Example 3*

An emulsion was prepared by adding 600 parts by weight of California asphalt to 400 parts by weight of water containing 20 parts by weight of the sodium salt of the sulfonation product of a substantially petroleum hydrocarbon-insoluble pine wood resin and emulsifying the mixture. The emulsion obtained had a demulsibility value of zero, a dehydration value of 41.3% and it passed the cement mixing test.

*Example 4*

The procedure of Example 3 was repeated using the unneutralized sulfonation product in place of its sodium salt. The emulsion resulting had a pH of 4.3. It passed the cement mixing test, showed a demulsibility value of zero and a dehydration value of 96.3%.

It will be understood that the details and examples hereinbefore set forth are illustrative only, and that the invention as broadly described and claimed is in no way limited thereby.

What I claim and desire to protect by Letters Patent is.

1. The process of preparing a bituminous emulsion of high stability which comprises emulsifying a bitumen in water containing a sulfonation product of a substantially petroleum hydrocarbon-insoluble pine wood resin as emulsifying and stabilizing agent, the amount of said sulfonation product being not in excess of about 3 percent by weight of the emulsion.

2. A bituminous emulsion of high stability comprising a bitumen, water, and as an emulsifying and stabilizing agent an acidic sulfonation product of a substantially petroleum hydrocarbon-insoluble pine wood resin, the amount of said acidic sulfonation product being not in excess of about 3% by weight of the emulsion.

3. A bituminous emulsion of high stability comprising a bitumen, water, and as an emulsifying and stabilizing agent a neutralized sulfonation product of a substantially petroleum hydrocarbon-insoluble pine wood resin, the amount of said neutralized sulfonation product being not in excess of about 3% by weight of the emulsion.

4. A bituminous emulsion of high stability comprising a bitumen, water, and as an emulsifying and stabilizing agent a sulfonation product of a substantially petroleum hydrocarbon-insoluble pine wood resin, the amount of said sulfonation product being not in excess of about 3 percent by weight of the emulsion.

EVART E. MAYFIELD.